United States Patent [19]

Tertilt

[11] Patent Number: 4,662,275
[45] Date of Patent: May 5, 1987

[54] MOBILE LARGE BALING PRESS FOR HARVESTED AGRICULTURAL PRODUCT

[75] Inventor: Werner Tertilt, Harsewinkel, Fed. Rep. of Germany

[73] Assignee: Claas OHG, Fed. Rep. of Germany

[21] Appl. No.: 867,370

[22] PCT Filed: Aug. 29, 1985

[86] PCT No.: PCT/DE85/00296
§ 371 Date: Jun. 11, 1986
§ 102(e) Date: Jun. 11, 1986

[87] PCT Pub. No.: WO86/01373
PCT Pub. Date: Mar. 13, 1986

[30] Foreign Application Priority Data
Sep. 1, 1984 [DE] Fed. Rep. of Germany ....... 3432265

[51] Int. Cl.⁴ .................... A01F 15/00; A01F 15/08
[52] U.S. Cl. ........................................ 100/89; 56/341
[58] Field of Search ..................... 100/88, 89; 56/341

[56] References Cited

U.S. PATENT DOCUMENTS

| 4,345,421 | 8/1982 | Schwalenberg et al. ......... 100/88 X |
| 4,566,380 | 1/1986 | Clostermeyer et al. ............. 100/89 |
| 4,580,398 | 4/1986 | Bruer et al. .......................... 56/341 |

FOREIGN PATENT DOCUMENTS

| 2656896 | 6/1978 | Fed. Rep. of Germany ........ 100/89 |
| 2150492 | 7/1985 | United Kingdom . |

Primary Examiner—Louis K. Rimrodt
Attorney, Agent, or Firm—Pollock, Vande Sande & Priddy

[57] ABSTRACT

The present invention relates to a spherical baling press with press and conveyer cylinders bordering the pressing area on the periphery with room left for a product entry slot. When viewed in the rotational direction of the bales, press cylinders located in front of the entry slot are gradually positioned closer to the periphery resulting in a spiral shape of the pressing area in front of the entry slot. As a result, the bale is in part compressed to a higher degree which has a particularly beneficial consequence if the product being baled consists of brittle straw.

5 Claims, 1 Drawing Figure

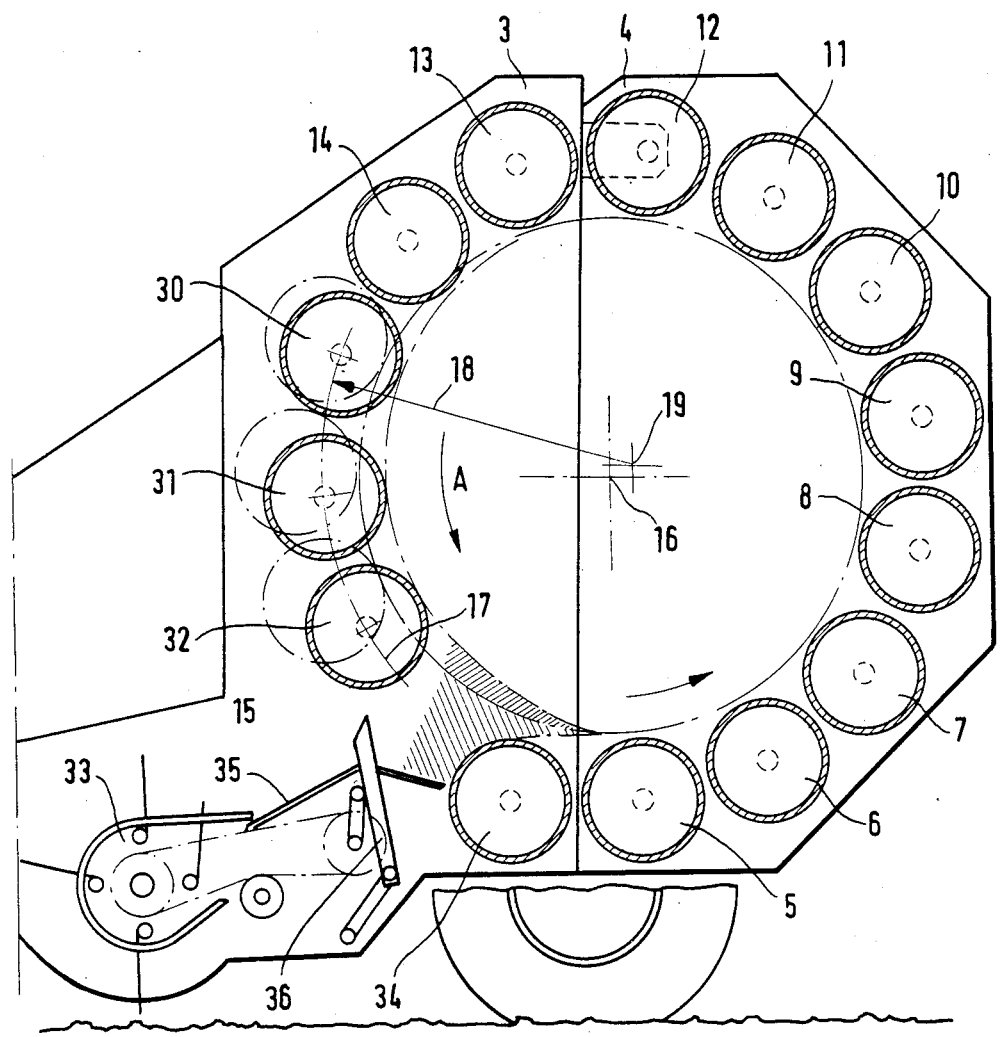

4,662,275

MOBILE LARGE BALING PRESS FOR HARVESTED AGRICULTURAL PRODUCT

FIELD OF THE INVENTION

The invention relates to a spherical baling press for producing large bales composed of harvested agricultural products. In such a press a folding pressing area, consisting of two pressing area halves, is borded on the periphery by press and conveyor cylinders. These cylinders are positioned and propelled in the housing walls which border the front side of the pressing area, whereby two neighboring press cylinders allow room for a product feed slot. The feed slot extends across the width of the machinery and the rotational axes of the press and conveyor cylinders are located on a circle. The center of this circle is the theoretical rotational axis of the pressing area.

STATE OF THE ART

In the case of known spherical baling presses of this type used today, it has repeatedly been observed that after initial rotation, the large bales being formed are brought to a standstill especially if the product being baled is brittle straw, such as corn stalks. As a result, additional product can no longer be fed and, secondly, the partially or completely formed bales can not be tied with twine. The tractor driver must, therefore, stop, open the press, and pull out the brittle straw (for example, manually) found in the pressing area. The resulting need to stop is very time consuming. Another disadvantage of the known spherical baling presses can be found in the fact that product separates near the entry slot in the case of bales consisting of short blades and stalks and the product falls down. In the case of presses in which the area between the pick-up drum and the press cylinder bordering the entry slot from below is bridged by a straight metal tray, this product falls onto the metal tray and remains there if the pick-up drum does not convey product for a short period of time. When product is once again fed, the materials often congest in front of the entry slot.

A large spherical baling press (see U.S. Pat. No. 4,345,421) is known in which the pressing area profile has an elliptical rather than an essentially round shape and the major axis is vertically positioned. The press is supposed to create a bale with a higher degree of rigidity. However, in order to form a firm round bale, constant high forces must be transferred from the cylinders at the periphery of the bales to the bales, and this is not possible with cylinders which cannot come into contact with the bale.

SUMMARY OF THE INVENTION

The problem facing the present invention, therefore, is to design a spherical baling press of the aforedescribed type in such a way that the requirements placed on it are satisfactorily fulfilled with respect to the unproblematic formation of bales, even in the case of brittle blades and stalks. According to the invention, this is achieved by the fact that the surface areas facing the pressing area of the press cylinders located in front of the product feed slot—when viewed in the direction of bale rotation—have a slightly smaller clearance to the theoretical rotational axis of the pressing area than the surface areas of the other conveyer elements. As a result, the pressing area is partially narrowed whereby the bale is in part compressed more prior to product feed.

BRIEF DESCRIPTION OF THE DRAWINGS

The invention is described below using an embodiment and a single, detailed diagram.

The diagram displays a schematic cross-section through the functionally relevant rear area of a preferred embodiment of a large baling press.

DETAILED DESCRIPTION OF THE INVENTION

The number 1 designates the frame of the large baling press which moves on wheels. Walls are placed on the frame, 1, which are separated into two parts. The housing, 4, is hinged onto part 3 of the walls which is rigidly connected to the frame, 1. The press cylinders which are positioned and propelled in the hinged housing part, 4, and which are positioned on a common radius with their rotational axes—seen from the theoretical rotational axis, 15, of the pressing area—are designated with the numbers 5 to 12. The press cylinders, 13, 14, of the housing part, 3, fixed to the frame are also on the aforementioned radius. In order to assure that the bale is constantly turned in the pressing area, even if it consists of smooth, brittle straw, the press cylinders, 30,31,32, located in front of the product entry slot, 15, when viewed in the direction of rotation, A, of the bale, have a gradually smaller clearance to the theoretical rotational axis, 16, of the bale. As can be seen from the single diagram, the press cylinders, 30 to 32, are located on a common arc, 17, with the radius, 18, whose center, 19, is above and slightly to the side of the rotational axis, 16, of the pressing area. This results in the fact that the press cylinder, 32, has the smallest clearance to the axis, 16, of the pressing area. As a result, in the area of the cylinders, 30 to 32, the pressing area has a spiral shape when viewed in the rotational direction, A, of the bale. Thereby, the bale experiences increased compression in this area. Extensive tests have shown that this results in a constant rotation of the bale even under the most unfavorable harvesting and/or material conditions as well as in the formation of firm bales even in the case of extremely dry and short pressed product. But if the flow of product fed from the pick-up drum, 33, becomes thinner or if there is partial cessation of feed, it was observed that part of the bale separates, particularly in the region of the entry slot, 15. The separated material then falls to the area between the pick-up drum, 33, and the press cylinder, 34, which borders the entry slot at the base and which is bridged by a metal tray, 35, which has slits for the conveyer prongs, 36. Because the metal tray is sloped downward in such a way that the part facing the cylinder, 34, converges on the rotational axis of the cylinder, 34, with its extension as conceived, then the product arrives at the press cylinder, 34, and is rotated by it. Both as a result of sloping the metal tray, 35, as well as of creating a narrowed, spiral shape of the pressing area near the entry slot, 15, the entry wedge depicted by slashes is increased which assures unproblematic constant rotation of the product. The invention is not tied to the embodiment used as an example. For example, the tighter press cylinders, 30 to 32, can rotate together as a single component so that their clearance to the rotational axis 16, can be changed.

I claim:

1. A spherical baling press for producing large bales made of a harvested agricultural product, including a folding pressing area consisting of two pressing area halves bordered by press and conveyer cylinders which are positioned and propelled in housing walls bordering the front side of the pressing area whereby two neighboring press cylinders allow room for a product feed slot extending across the width of the machinery and whereby the rotational axes of the press and conveyer cylinders are located on a circle whose center is the theoretical rotational axis of the pressing area, characterized by the fact that the surface areas facing the pressing area of the press cylinders, located in front of the product feed slot, when viewed in the rotational direction of the bales, have a smaller clearance to the theoretical rotational axis of the pressing area than the surface areas of the other conveyer elements.

2. A spherical baling press in accordance with claim 1 characterized by the fact that the surface areas facing the pressing area of the press cylinders located in front of the product feed slot, when viewed in the rotational direction of the bales, are placed increasingly closer to the center with respect to the theoretical rotational axis of the pressing area.

3. A spherical baling press in accordance with claims 1 or 2 characterized by the fact that the central axes of the press cylinders which are positioned with increasingly shorter clearance to the rotational axis of the pressing area are found on the common arc of a circle.

4. A spherical baling press in accordance with claims 1 or 2, characterized by the fact that at least the first press cylinder, when viewed in the rotational direction of the bale, is positioned further away from center with respect to the theoretical limitation surface of the pressing area, which forms the interior sheathing of the press cylinders that are positioned in a circle.

5. A spherical baling press in accordance with claims 1 or 2, having conveyer prongs located in front the product entry slot and a metal tray having slits for the conveyer prongs characterized by the face that the metal tray with its end facing the first press cylinder is sloped downward and terminates near the press cylinder.

* * * * *